(12) United States Patent
Sugiura et al.

(10) Patent No.: US 9,740,836 B2
(45) Date of Patent: Aug. 22, 2017

(54) LICENSING FOR EACH OF SOFTWARE MODULES OF APPLICATION FOR EXECUTION ON THE APPARATUS

(75) Inventors: Yuuko Sugiura, Tokyo (JP); Taku Nagumo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 803 days.

(21) Appl. No.: 12/550,823

(22) Filed: Aug. 31, 2009

(65) Prior Publication Data
US 2010/0071069 A1    Mar. 18, 2010

(30) Foreign Application Priority Data
Sep. 12, 2008 (JP) .................. 2008-235679

(51) Int. Cl.
  *G06F 21/12* (2013.01)
  *G06F 21/10* (2013.01)
  *G06F 21/60* (2013.01)

(52) U.S. Cl.
  CPC .......... *G06F 21/105* (2013.01); *G06F 21/10* (2013.01); *G06F 21/121* (2013.01); *G06F 21/608* (2013.01)

(58) Field of Classification Search
  CPC ...... G06F 21/10; G06F 21/105; G06F 21/121; G06F 21/608
  USPC ......................................................... 726/26
  See application file for complete search history.

(56) References Cited

U.S. PATENT DOCUMENTS

| | | | | |
|---|---|---|---|---|
| 7,092,953 | B1 * | 8/2006 | Haynes | G06F 17/30011 705/51 |
| 7,290,144 | B1 * | 10/2007 | Kitaj et al. | 713/182 |
| 7,640,403 | B2 * | 12/2009 | Matsushima | 711/154 |
| 7,818,741 | B1 * | 10/2010 | Bourdev | 717/174 |
| 8,090,960 | B2 * | 1/2012 | Okawa | 713/192 |
| 8,094,330 | B2 * | 1/2012 | Ohishi et al. | 358/1.15 |
| 8,230,515 | B1 * | 7/2012 | Brewton et al. | 726/27 |
| 2004/0205261 | A1 * | 10/2004 | Osada | 710/8 |
| 2004/0230842 | A1 * | 11/2004 | Osada | 713/202 |
| 2005/0108176 | A1 * | 5/2005 | Jarol | G06Q 30/02 705/59 |
| 2005/0251487 | A1 * | 11/2005 | Evans | G06F 21/10 705/59 |

(Continued)

FOREIGN PATENT DOCUMENTS

| | | |
|---|---|---|
| JP | 2004-118237 | 4/2004 |
| JP | 2004-139149 | 5/2004 |

(Continued)

*Primary Examiner* — Theodore C Parsons
(74) *Attorney, Agent, or Firm* — Oblon, McClelland, Maier & Neustadt, L.L.P.

(57) ABSTRACT

An image forming apparatus capable of executing an application formed by a plurality of program modules is disclosed, including: a correspondence information storing part, a determination part, and a boot control part. A correspondence information storing part stores correspondence information corresponding to the plurality of program modules and a plurality of sets of license data for the application. A determination part determines whether to permit or deny activation based on the license data corresponded to the correspondence information for each of the program modules included in the application. A boot control part activates one or more program modules which are permitted to be activated by the determination part.

20 Claims, 17 Drawing Sheets

(56) References Cited

U.S. PATENT DOCUMENTS

| | | | |
|---|---|---|---|
| 2005/0289072 A1* | 12/2005 | Sabharwal | 705/59 |
| 2005/0289074 A1* | 12/2005 | Coley et al. | 705/59 |
| 2006/0200421 A1* | 9/2006 | Harada | 705/59 |
| 2007/0016532 A1* | 1/2007 | Zhang et al. | 705/59 |
| 2008/0005029 A1* | 1/2008 | Ando | 705/51 |
| 2008/0123125 A1 | 5/2008 | Fukuda | |
| 2008/0183624 A1* | 7/2008 | Grigorovitch et al. | 705/51 |
| 2008/0209569 A1* | 8/2008 | Araki | 726/26 |
| 2008/0235803 A1* | 9/2008 | Harada | 726/26 |
| 2008/0250472 A1* | 10/2008 | Tanaka et al. | 726/1 |
| 2009/0241107 A1* | 9/2009 | Kobayashi | 717/178 |
| 2009/0271319 A1* | 10/2009 | Bromley et al. | 705/59 |
| 2013/0198734 A1* | 8/2013 | Biswas | G06F 21/105 717/174 |

FOREIGN PATENT DOCUMENTS

| | | |
|---|---|---|
| JP | 2004-213469 | 7/2004 |
| JP | 2005-161674 | 6/2005 |
| JP | 2006-40217 | 2/2006 |
| JP | 2006-235963 | 9/2006 |
| JP | 2006-271005 | 10/2006 |
| JP | 2006-311590 | 11/2006 |
| JP | 2008-104143 | 5/2008 |
| JP | 2008-134702 | 6/2008 |
| JP | 4200067 | 10/2008 |

\* cited by examiner

| APPLICATION ID | 123456789 |
|---|---|
| LICENSE IDENTIFICATION SUB-NUMBER | 00, 01 |
| LICENSE DISPLAY NAME | AAA_main, AAA_basic |

1402c

| APPLICATION ID | 123456789 |
|---|---|
| LICENSE IDENTIFICATION SUB-NUMBER | 01 |
| LICENSE DISPLAY NAME | AAA_basic |

1402d

| APPLICATION ID | 123456789 |
|---|---|
| LICENSE IDENTIFICATION SUB-NUMBER | 01 |
| LICENSE DISPLAY NAME | AAA_basic |

FIG.6

| LICENSE IDENTIFICATION NUMBER | LICENSE DISPLAY NAME | LICENSE SUBJECT |
|---|---|---|
| 123456789-00 | AAA_main | FUNCTION MODULE A |
| 123456789-01 | AAA_basic | FUNCTION MODULE A, FUNCTION MODULE C, FUNCTION MODULE D |

FIG.8

APPLICATION ID: 123456789

| PRODUCT KEY | LICENSE IDENTIFICATION NUMBER | NUMBER OF LICENSES | NUMBER OF ISSUED LICENSES | LICENSE KEY | ⟋53 |
|---|---|---|---|---|---|
| AAA | 123456789-01 | 1 | 0 | | ... |
| BBB | 123456789-00 | 5 | 0 | | ... |
| .. | .. | .. | .. | | .. |

FIG.11

| LICENSE IDENTIFICATION NUMBER | DEVICE CODE | ... |

FIG.12

APPLICATION ID: 123456789

| PRODUCT KEY | LICENSE IDENTIFICATION NUMBER | NUMBER OF LICENSES | NUMBER OF ISSUED LICENSES | LICENSE KEY |
|---|---|---|---|---|
| AAA | 123456789-01 | 1 | 1 | BJP138-BUQ |
| BBB | 123456789-00 | 5 | 0 | |
| .. | .. | .. | .. | .. |

| LICENSE IDENTIFICATION NUMBER | LICENSE DISPLAY NAME | LICENSE SUBJECT |
|---|---|---|
| 123456789-00 | AAA_main | FUNCTION MODULE A |
| 123456789-01 | AAA_basic | FUNCTION MODULE A, FUNCTION MODULE C, FUNCTION MODULE D |
| 123456789-81 | PluginCD | FUNCTION MODULE C, FUNCTION MODULE D |

FIG.17

| LICENSE IDENTIFICATION NUMBER | LICENSE DISPLAY NAME | LICENSE SUBJECT |
|---|---|---|
| 123456789-00 | AAA_main | FUNCTION MODULE A |
| 123456789-01 | AAA_basicC | FUNCTION MODULE A, FUNCTION MODULE C |
| 123456789-02 | PluginC | FUNCTION MODULE C |
| 123456789-03 | AAA_basicD | FUNCTION MODULE A, FUNCTION MODULE D |
| 123456789-04 | PluginD | FUNCTION MODULE D |

LICENSING FOR EACH OF SOFTWARE MODULES OF APPLICATION FOR EXECUTION ON THE APPARATUS

BACKGROUND OF THE INVENTION

1. Field of the Invention

The present invention is related to an image forming apparatus, a license determination method, and a computer-readable recording medium thereof, and more particularly to the image forming apparatus, the license determination method, and the computer-readable recording medium thereof, in which an application formed by a plurality of program modules can be executed.

2. Description of the Related Art

Recently, mainly in an image forming apparatus which is called an integrated function apparatus or a multi-functional apparatus, a new application can be developed or be installed even after the image forming apparatus has been shipped (for example, refer to Japanese Laid-open Patent Application No. 2004-118237). According to the image forming apparatus having this configuration, it is possible to significantly improve an enhancement of a function of the image forming apparatus and provide ease of customization of the function.

On the other hand, there is a concern that an application, in which individual distribution is possible, may be illegally used by unauthorized copying and the like. Therefore, Japanese Laid-open Patent Application No. 2004-118237 proposes to prevent the illegal use by managing a license of the application.

Meanwhile, the configuration of the application has been flexible. A function of the application can be enhanced by a function module called a plug-in. Also, a usage pattern of a user becomes more versatile. Thus, a user may desire only a specific function to use from all functions being provided by the application. However, the license of the application has not been managed based on the usage pattern of the user.

Accordingly, since the license is granted to the user for each application, even if the user desires to use the specific function only from amongst all functions of the application, the user is charged for all functions of the entire application.

Moreover, since a license of the plug-in is given with the license of the application, a developer of the plug-in may fail to be paid for use of the plug-in.

SUMMARY OF THE INVENTION

The present invention solves or reduces one or more of the above problems.

In an aspect of this disclosure, there is provided an image forming apparatus capable of executing an application formed by a plurality of program modules, the image forming apparatus including: a correspondence information storing part configured to store correspondence information corresponding to the plurality of program modules and a plurality of sets of license data for the application; a determination part configured to determine whether to permit or deny activation based on the license data corresponded by the correspondence information for each of the program modules included in the application; and a boot control part configured to activate one or more program modules which are permitted to be activated by the determination part.

In other aspects of this disclosure, there may be provided a license determination method performed in the image forming apparatus, and a computer-readable recording medium encoded with a computer program for causing the image forming apparatus to execute an application formed by a plurality of program modules.

BRIEF DESCRIPTION OF THE DRAWINGS

In the following, embodiments of the present invention will be described with reference to the accompanying drawings.

FIG. 5 is a diagram illustrating a first definition example of a license information file of each of function modules according to the embodiment of the present invention;

FIG. 6 is a diagram illustrating a license which becomes valid based on the first definition example of the license information file according to the embodiment of the present invention;

FIG. 8 is a diagram illustrating a configuration example of a license issuance information management table according to the embodiment of the present invention;

FIG. 11 is a diagram illustrating a configuration example of the license key according to the embodiment of the present invention;

FIG. 12 is a diagram illustrating an example of a license issuance information management table which is updated by issuing the license key, according to the embodiment of the present invention;

FIG. 15 is a diagram illustrating a configuration of the licenses which become valid based on the second definition example of the license information file, according to the embodiment of the present invention;

FIG. 17 is a diagram illustrating a configuration of the licenses which become valid based on the third definition example of the license information file according to the embodiment of the present invention.

DESCRIPTION OF THE PREFERRED EMBODIMENT

Figure 1:
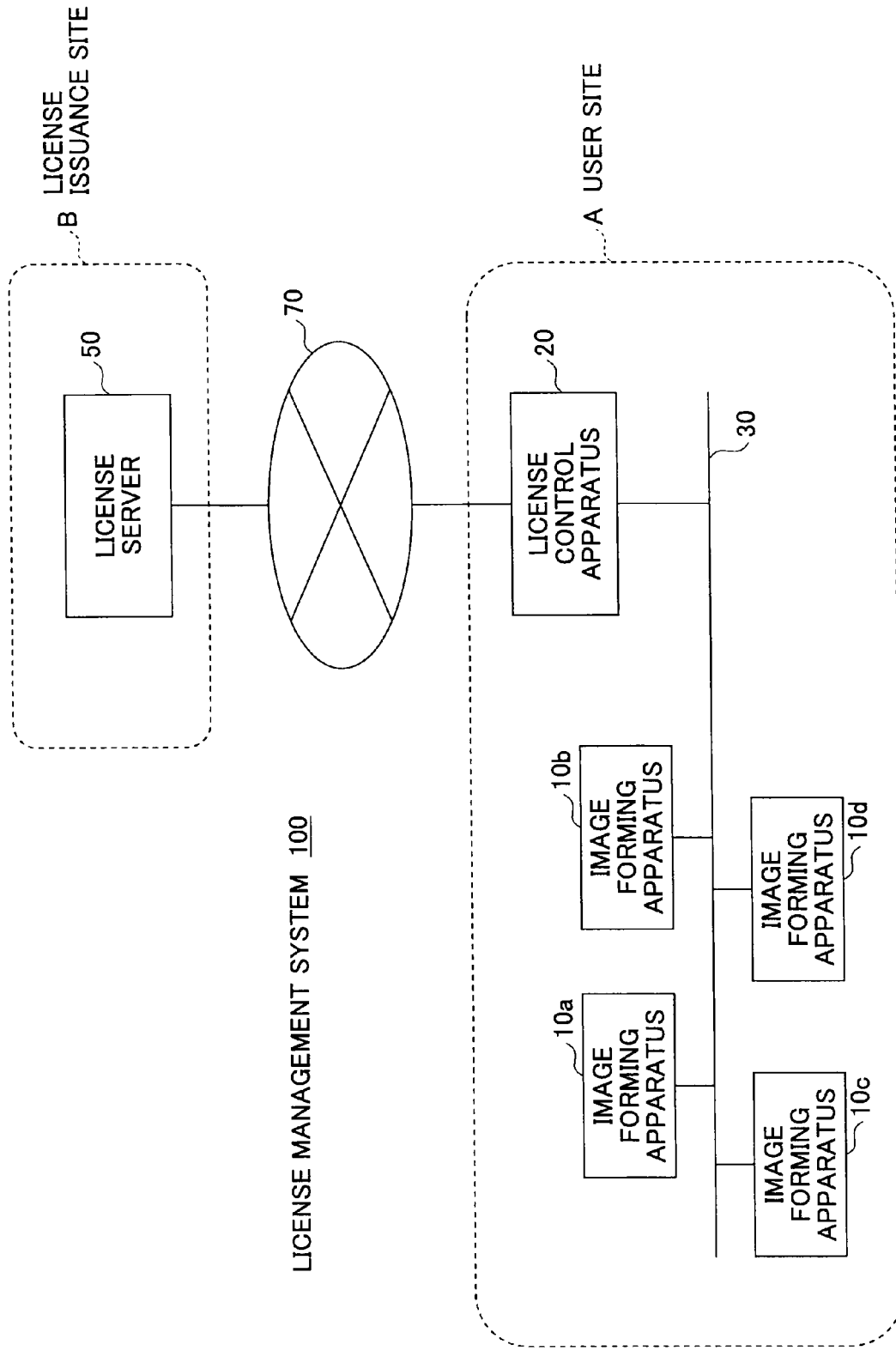
FIG. 1 is a diagram illustrating a configuration example of a license management system according to an embodiment of the present invention.

In the following, the present invention will be described with reference to the accompanying drawings. FIG. 1 is a diagram illustrating a configuration example of a license management system according to an embodiment of the present invention. In FIG. 1, the license management system 100 includes a user site A, a license issuance site B, and the like.

The user site A is a user environment of an image forming apparatus (device), and corresponds to an office of the user. Accordingly, a plurality of the user sites A may exist for respective user environments. In the user site A, a license control apparatus 20 and at least one of image forming apparatuses 10a, 10b, 10c, 10d, . . . (hereinafter, collectively called "image forming apparatus 10") are connected through a network 30 (a wired line or a wireless line) such as a LAN (Local Area Network) or the like. In general, the image forming apparatus 10 is a device referred to as an integrated function apparatus or a multi-functional apparatus, and includes hardware to realize a plurality of functions such as a copy function, a printer function, a scanner function, a facsimile function, and the like in a single body. The image forming apparatus 10 allows installing various applications using these functions. However, the image forming apparatus 10, to which the present invention can be applied, is not limited to the integrated function apparatus, but the image forming apparatus 10 is at least an apparatus in which an application can be installed and executed. Accordingly, the image forming apparatus 10 may realize a single function of the copy function, the printer function, the scanner function, the facsimile function, and the like.

The license control apparatus 20 is a computer such as a PC (Personal Computer) to acquire licenses (right to use) of the application which is operated in the image forming apparatus 10 in the user site A. That is, various applications installed in the image forming apparatus 10 are permitted to be used according to the licenses acquired by the license control apparatus 20.

The license issuance site B is an environment in which a license is issued for the application of the image forming apparatus 10 used at the user site A. For example, the license issuance site B is managed by a manufacturer of the image forming apparatus 10. In the license issuance site B, a license server 50 is installed. The license server 50 is a computer to execute a generation and an issuance of a license.

The license control apparatus 20 and the license server 50 are connected through a wide area network 70 such as the Internet or the like.

Figure 2:
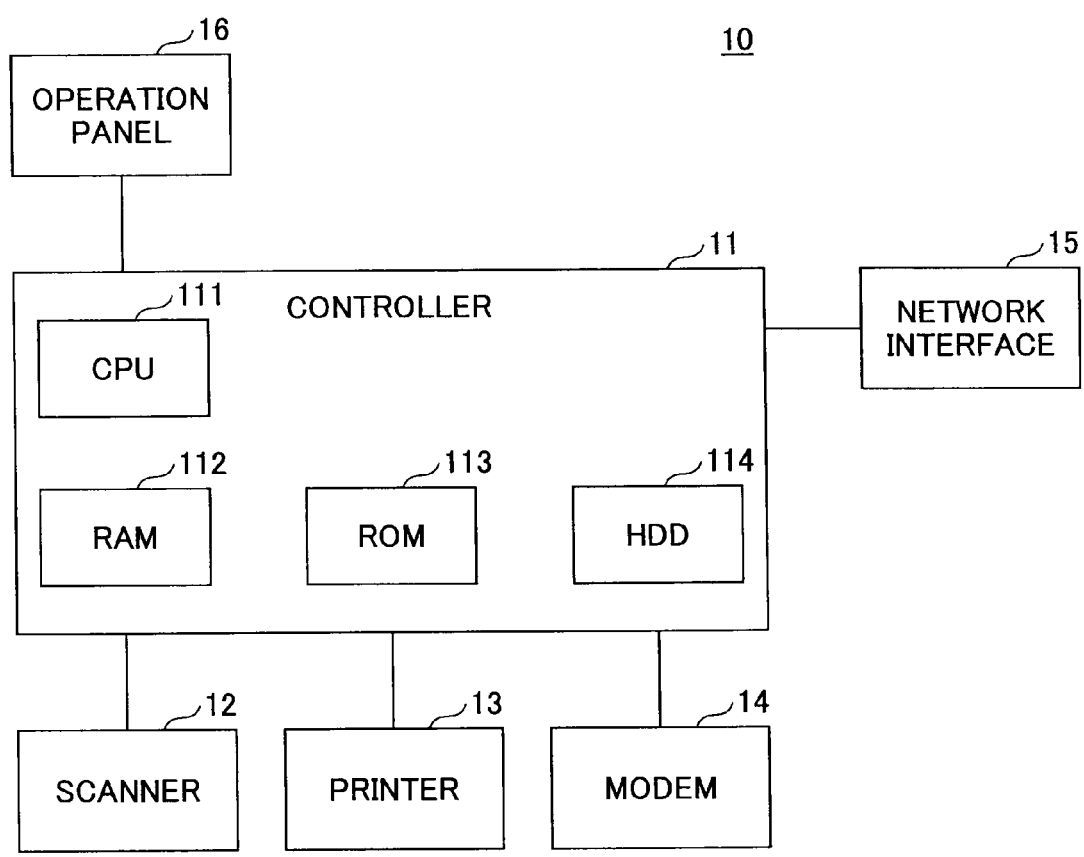
FIG. 2 is a diagram illustrating a hardware configuration example of an image forming apparatus according to the embodiment of the present invention.

The image forming apparatus 10 will be described in detail. FIG. 2 is a diagram illustrating a hardware configuration example of the image forming apparatus 10 according to the embodiment of the present invention. In FIG. 2, the image forming apparatus 10 includes hardware such as a controller 11, a scanner 12, a printer 13, a modem 14, a network interface 15, a control panel 16, and the like.

The controller 11 includes a CPU (Central Processing Unit) 111, a RAM (Random Access Memory) 112, a ROM (Read-Only Memory) 113, an HDD (Hard Disk Drive) 114, and the like. The ROM 113 stores various programs, data used by the programs, and the like. The RAM 112 is used as a storage area to load a program, a working area for the loaded program, and the like. The CPU 111 realizes various functions by processing the program being loaded in the RAM 112. The HDD 114 stores programs, data used by the programs, and the like.

The scanner 12 is hardware to read out image data from an original. The printer 13 is hardware to print out the image data onto a printing sheet. The modem 14 is hardware to connect to a telephone line, and is used to send and receive the image data by a FAX communication. The network interface 15 is hardware to connect to the network 30 (the wired line or the wireless line) such as the LAN (Local Area Network) or the like. The operation panel 16 is hardware including buttons for receiving an input of a user, a liquid crystal panel for displaying information for the user, and the like.

Figure 3:
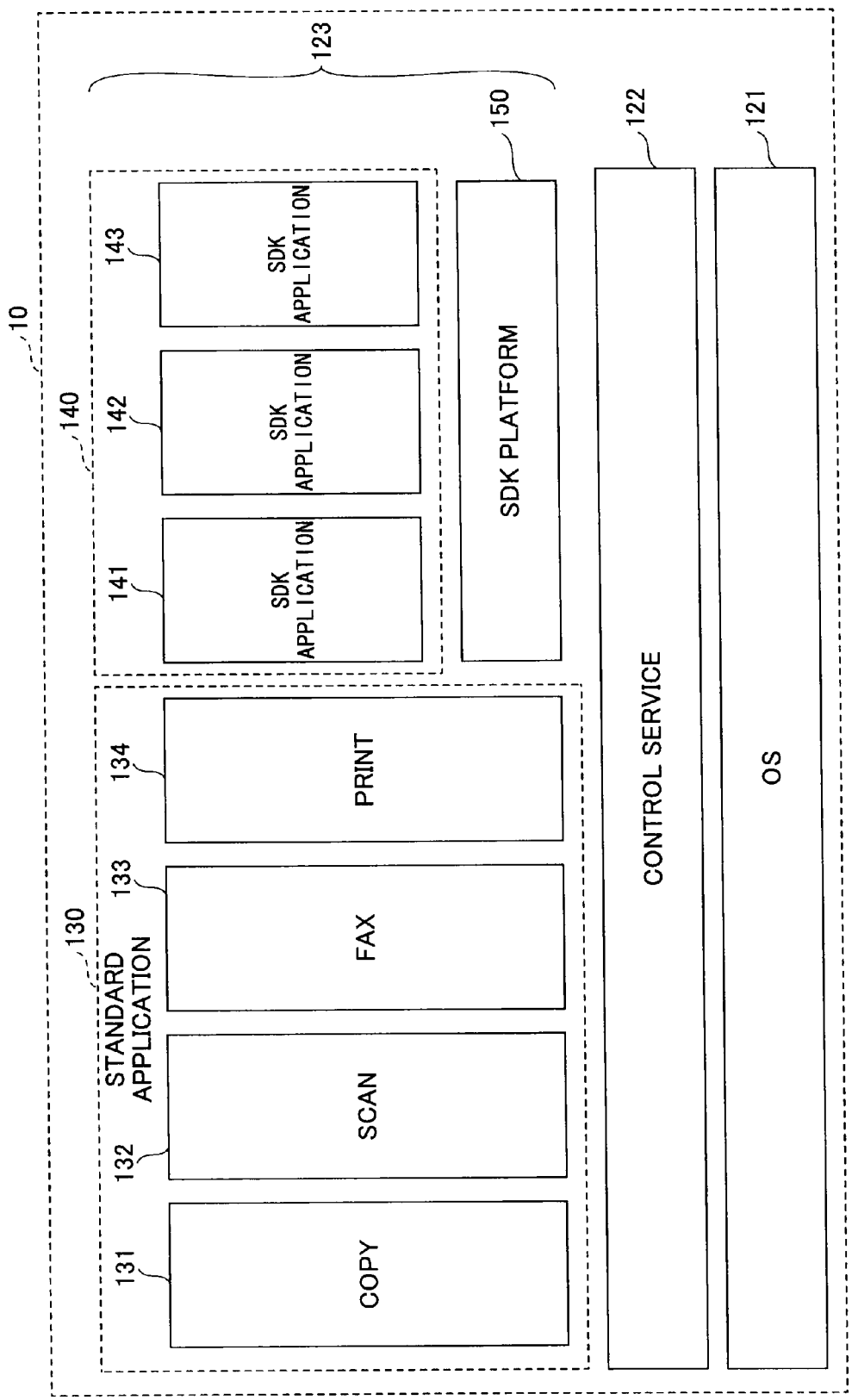
FIG. 3 is a diagram illustrating a software configuration example of the image forming apparatus according to the embodiment of the present invention.

FIG. 3 is a diagram illustrating a software configuration example of the image forming apparatus according to the embodiment of the present invention. In FIG. 3, the image forming apparatus 10 includes software such as an OS (Operating System) 121, a control service 122, applications 123, and the like.

The OS 121 is an operating system such as UNIX or the like, and activates various kinds of software by process units in parallel.

The control service 122 includes a software module group which provides services for controlling various hardware resources and the like in common to superordinate applications. For example, the control service 122 provides a part which controls the scanner 12 or the printer 13, a communication part which conducts a communication through the modem 14 or the network interface 15.

The applications 123 are programs which make the image forming apparatus 10 execute various jobs requested by the user, by using the control service 122, the OS 121, and the like. The applications 123 are broadly classified into a group of standard applications 130 and another group of SDK applications 140.

The standard applications 130 are applications which are normally implemented in the image forming apparatus (before the image forming apparatus is shipped). In FIG. 3, a copy application 131 which controls a copy job, a scan application 132 which controls a scan job, a FAX application 133 which controls a facsimile transmission, a print application 134 which controls a print job, and the like are given as examples.

The SDK applications 140 are applications which are developed by using a SDK (software development kit) dedicated to the image forming apparatus 10, and operate on an SDK platform 150. That is, a new application can be added to the image forming apparatus 10 by using the SDK dedicated thereto after shipping. In FIG. 3, SDK applications 141, 142, and 143 are given as examples. In order to activate the SDK applications 140 in the image forming apparatus 10, it is required to acquire license keys corresponding to the SDK applications 140. The license keys are data to permit using the SDK application 140 and are specific to the image forming apparatus 10. In this embodiment, the SDK applications 140 are programmed in the Java language. However, the SDK applications 140 in this embodiment are not limited to programs developed in the Java language.

The SDK platform 150 is software which provides an operation environment of the SDK applications 140. For example, the SDK platform 150 includes a Java virtual machine, a class group normally provided by Java ME (Micro Edition), a class group wrapping a function of the control service 122, and the like. Also, the SDK platform 150 conducts a license management concerning the SDK applications 140. For example, the SDK applications 140 manage the license keys for each of the SDK applications 140, and each of the SDK applications 140 is activated and controlled based on the license keys.

Figure 4:
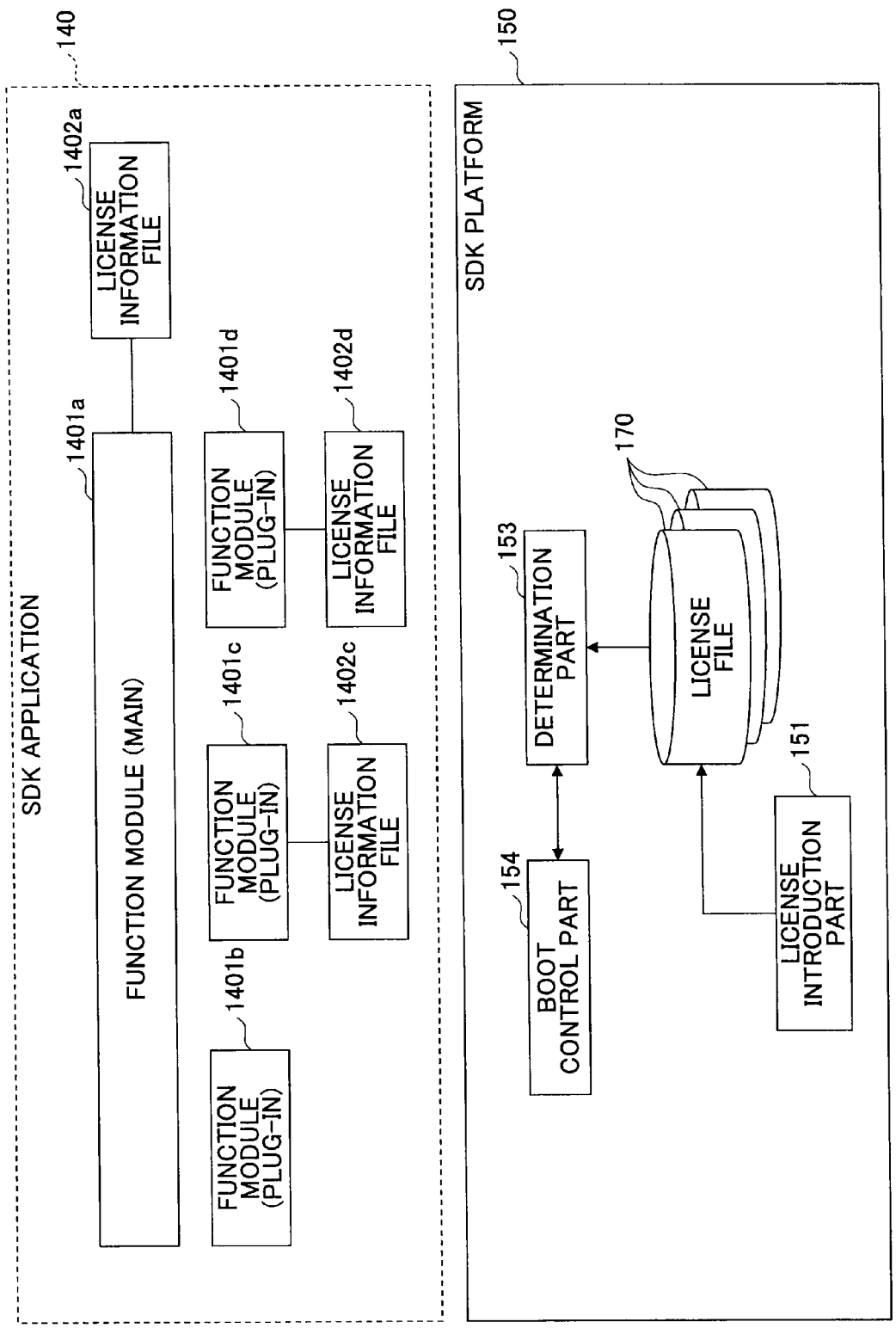
FIG. 4 is a diagram illustrating a license management function in an SDK platform and a configuration example of an SDK application according to the embodiment of the present invention.

FIG. 4 is a diagram illustrating a configuration example of a license management function in the SDK platform 150.

As illustrated in FIG. 4, one of the SDK applications 140 includes one or more function modules 1401a through 1401d (hereinafter, collectively called function modules 1401) (for example, a program module such as a JAR (Java archive) file or the like), and one or more license information files 1402a, 1402c, and 1402d (hereinafter, collectively called license information files 1402) accompanying (corresponding to) respective function modules 1401. There are some of the function modules 1401 that are not accompanied by respective license information files. Each of the function modules 1401 realizes apart of a function forming a job, which is executed by one of the SDK applications 140 to which the function module 1401 belongs. The license information file 1402 is a file including information concerning a license of the respective function module 1401. For example, each of the license information files 1402 stores an identification (a license identification number which will be described later) of the license key corresponding to the function module 1401 associated with the license information file 1402. The license information file 1402 is stored in the HDD 114. A correspondence information storing part is formed by the HDD 114 in which the license information file 1402 is stored. One function module 1401 may be associated with one license information file 1402 by an arbitrary method. For example, one function module 1401 and one license information file 1402 may be stored in the same archive file of a zip format or the like. Alternatively, each of license information files 1402 may have a letter string for identifying an association with a respective function module 1401 in a file name.

The SDK application 140 illustrated in FIG. 4 includes the function modules 1401a, 1401b, 1401c, and 1401d as the function modules 1401. Also, the SDK application 140 includes the license information files 1402a, 1402c, and 1402d as the license information files 1402. The license information file 1402a is the license information file accompanying the function module 1401a. The license information file 1402c is the license information file accompanying the function module 1401c. The license information file 1402d is the license information file accompanying the function module 1401d. It should be noted that no license information file accompanies with the function module 1401b. This indicates that the function module 1401b is not a license subject. That is, a license check is not required for the function module 1401b (for example, the function module 1401b is license-free).

Moreover, among the function modules 1401, there is a parent-child relationship (dependency relation). In FIG. 4, the function module 1401a is a parent and other function modules 1401b, 1401c, and 1401d are children. The function module 1401a being the parent is the function module 1401 for conducting a main process for the SDK application 140, and is also called "main function module 1401a" hereinafter. The main function module 1401a is mandatory to activate SDK application 140.

On the other hand, the function modules 1401b through 1401d being children are provided as the plug-ins, and provide enhanced functions to the SDK application 140. Hereinafter, the function modules 1401b through 1401d being children are also called "plug-in function modules 1401b through 1401d". The plug-in function modules 1401b through 1401d may be packaged and distributed together with the main function module 1401a, or may be packaged and distributed separately from the main function module 1401a. Moreover, the right to use each of the plug-in function modules 1401b through 1401d can correspond to the same license key as the main function module 1401a, or may be corresponded to a separate license key from the main function module 1401a. Moreover, among the plug-in function modules 1401b through 1401d, the same license key may correspond to the right to use, or separate license keys may correspond to the right to use.

The dependency relation of the licenses are defined in the license information files 1402a, 1402c, and 1402d. FIG. 5 is a diagram illustrating a first definition example of the license information file 1402 for each of the function modules 1401 according to the embodiment. In FIG. 5, parts that are the same as those shown in the previously described figures are given the same reference numbers.

In FIG. 5, each of the license files 1402 includes an application ID, a license identification sub-number, a license display name, and the like. The application ID is an identification of the SDK application 140 to which the function module 1401 belongs. That is, a unique application ID is assigned to each of the SDK applications 140. The license identification sub-number is a number (hereinafter, called "license identification number") for identifying a configuration of the right (license) to use one of the SDK applications 140. The license identification number is formed in a format of <application ID>-<license identification sub-number>. The function modules 140 having the same license identification number can be used by the same license key. Moreover, the function modules 140, to which a plurality of license identification numbers are registered, can be used by the license keys according to respective license identification numbers. That is, with respect to one SDK application 140, a plurality of various licenses can be set in response to a configuration of the function module 1401. The license display name is defined for each of the license identification sub-numbers (for each of the license identification numbers), and is used as a letter string for a display to allow the selection of one license when the license key is installed.

In FIG. 5, the application ID is the same for all license information files 1402. Thus, it is possible to identify that each of the function modules 1401 associated with the respective license information files 1402 belong to the same SDK application 140.

The license identification sub-numbers of the license information file 1402a are "00" and "01". Accordingly, the use of the function module 1401a by the license key according to the license identification number "123456789-00" or "123456789-01" can be distinguished. Also, since the license identification sub-number includes "00", the function module 1401a can be identified as the main function module 1401. Also, the license display name of the license information file 1402a can be "AAA_main" or "AAA_basic". The license display name "AAA_main" is used for the license identification number "123456789-00", and the license display name "AAA_basic" is used for the license identification number "123456789-01".

On the other hand, the license identification sub-number "01" is used for both the license information files 1402c and 1402d. Accordingly, the use of the function modules 1401c and 1401d can be used by the license key according to the license identification number "123456789-01" can be distinguished. For both the license information files 1402 and 1402d, the same license display name "AAA_basic" as the license file 1402a is registered for the license identification number "123456789-01". The function modules 1401c and 1401d are separate individual function modules 1401. However, the same license identification number is assigned to the function modules 1401c and 1401d. As an example, there is a case in that the function modules 1401c and 1401d are packaged as a plug-in set.

A configuration of the licenses permitted by the first definition example of the license information file 1402 in FIG. 5 is illustrated in FIG. 6. In FIG. 6, function modules A, C, and D correspond to the function modules 1401a, 1401c, and 1401d.

As illustrated in FIG. 6, by the license key according to the license identification number "123456789-00" (AAA_main), the right to use is given for the function module 1401a alone. On the other hand, by the license key according to the license identification number "123456789-01" (AAA_basic), the right to use is given for the function modules 1401a, 1401c, and 1401d.

Referring back to FIG. 4, the SDK platform 150 includes a license introduction part 151, a determination part 153, a boot control part 154, license files 170, and the like.

The license introduction part 151 acquires the license key corresponding to the SDK application 140 (the function module 1401) from the license control apparatus 20, and stores the acquired license key to the license file 170 maintained in the HDD 114. By introducing the license key, the SDK application or the function module 1401 according to the license key can be used.

The boot control part 154 controls activating and stopping the SDK application 140. When the SDK application 140 is activated, the boot control part 154 controls activation by a unit of the function module 1401 (to load to RAM 112) by inquiring to the determination part 153 regarding a license state of the SDK application 140.

The determination part 153 determines whether to permit or deny activating the function modules 1401 (the function modules 1401a, 1401b, and 1401c) which are the license subjects in the function modules 1401 belonging to the SDK application 140 to be activated.

Figure 7:
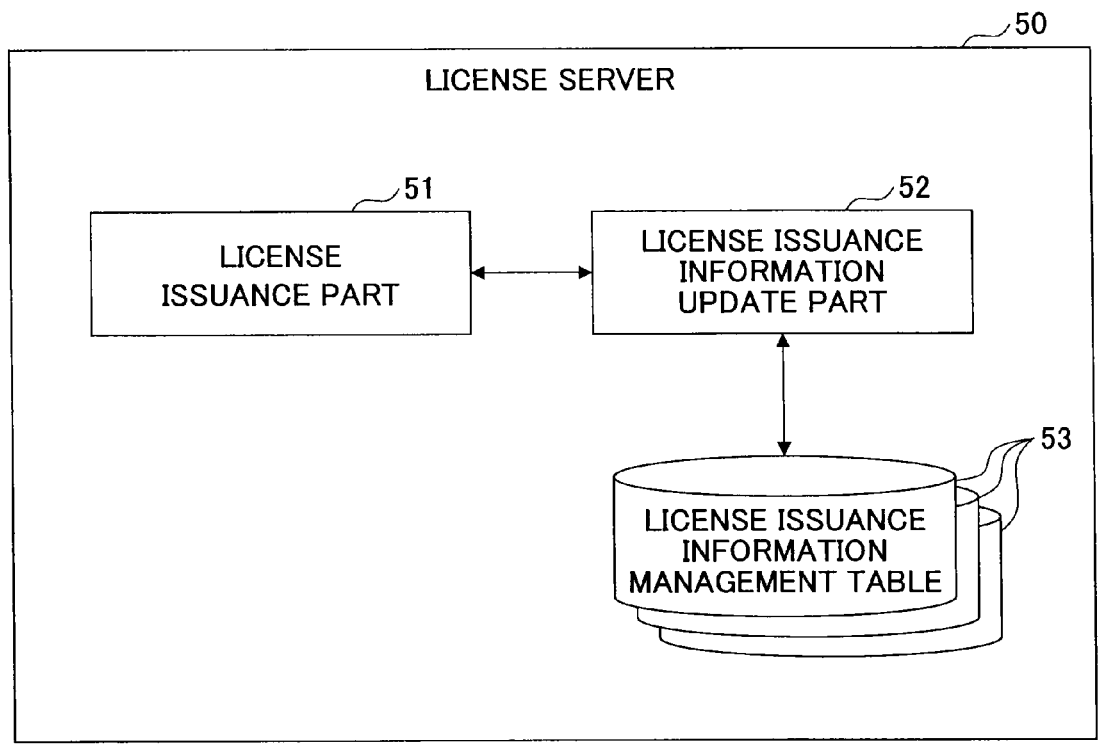
FIG. 7 is a diagram illustrating a functional configuration example of a license server according to the embodiment of the present invention.

Moreover, the license server 50 and the license control apparatus 20 will be described in detail. FIG. 7 is a diagram illustrating a functional configuration example of the license server according to the embodiment of the present invention. In FIG. 7, the license server 50 includes a license issuance part 51, a license issuance information update part 52, license issuance information management tables 53, and the like. The parts 51 through 53 can be realized by a CPU of the license server 50 which executes a program installed into the license server 50.

The license issuance part 51 issues (generates) the license key when an issuance of the license key is requested from the user site A. The license issuance information update part 52 records information indicating an issuance state of the license key with respect to a product key to one of the license issuance information management tables 53.

The product key is an identification which is uniquely issued (or assigned) every time a product is purchased. For example, the product key is attached to the product and distributed to a purchaser. In this embodiment, the product is the SDK application 140 or the plug-in function module 1401. The product can be formed by a single plug-in function module 1401.

When the product is purchased, a type of the license (type corresponding to the license identification number) for the product to be purchased and a number of the licenses for the product are selected by the purchaser. That is, purchasing the product means purchasing one or more licenses for the product. Accordingly, the function module 1401, of which the license is sold to the purchaser (of which the license key can be acquired), is determined by the product key distributed accompanying the purchase of the product.

FIG. 8 is a diagram illustrating a configuration example of the license issuance information management table 53. The license issuance information management table 53 illustrated in FIG. 8 is a table for the SDK application 140 having the application ID "123456789". That is, the license issuance information management table 53 is created for each product.

As illustrated in FIG. 8, the license issuance information management table 53 includes items of a license identification number, the number of licenses, the number of issued licenses, the license key, and the like for each of issued product keys. The license identification number and the number of licenses are indicated when the SDK application 140 is purchased. The number of issued licenses is the number of issued license keys based on the product keys. The license key indicates a list of currently issued license keys.

For example, in a case in which the SDK application 140 of the application ID "123456789" has the configurations illustrated in FIG. 4 and FIG. 5, referring to the license issuance information management table 53 in FIG. 8, the product key "AAA" corresponds to the license identification number "123456789-01". Accordingly, it can be understood that the license making possible the use of the function modules 1401a, 1401c, and 1401d is issued when one license is purchased. Also, the product key "BBB" corresponds to the license identification number "123456789-00". It can be understood that the licenses making possible the use of the function module 1401a are issued when five licenses are purchased. Moreover, since the number of issued licenses corresponding to each product indicates zero, the license keys have not been issued yet for any of the licenses. The license issuance information management table 53 is stored in a storage unit of the license server 50.

The product key is input information to issue the license. At a time of purchasing the SDK application 140, a user possesses the SDK application 140 and the product key. In this point, the user can install the SDK application 140 to the image forming apparatus 10 but is not permitted to use the SDK application 140. As described above, it is determined based on the license key whether or not the SDK application is permitted to be activated. If the user desires to use the SDK application 140, the user acquires the license key based on the product key. The user can acquire one or more license keys for the number of licenses based on one product key. The function module 1401 belonging to the same product key is permitted to be used by the same license key. It should be noted that the function module 1401 belonging to the product key is a function module included in the product corresponding to the product key.

Figure 9:
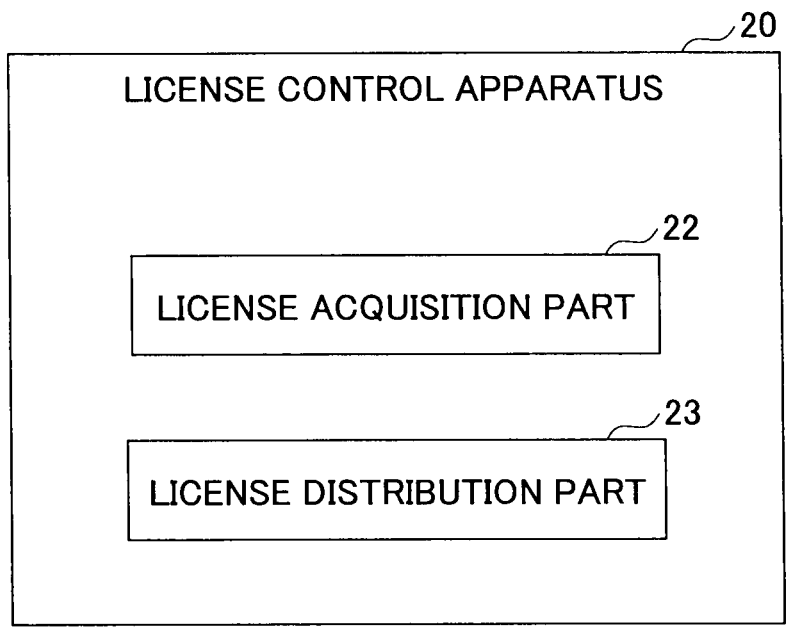
FIG. 9 is a diagram illustrating a functional configuration example of a license control apparatus according to the embodiment of the present invention.

FIG. 9 is a diagram illustrating a functional configuration example of the license control apparatus 20 according to the embodiment of the present invention. In FIG. 9, the license control apparatus 20 includes a license acquisition part 22, a license distribution part 23, and the like.

The license acquisition part 22 receives an issuance of the license in response to an indication input of the user. The license distribution part 23 distributes the issued license key to the image forming apparatus 10.

Figure 10:
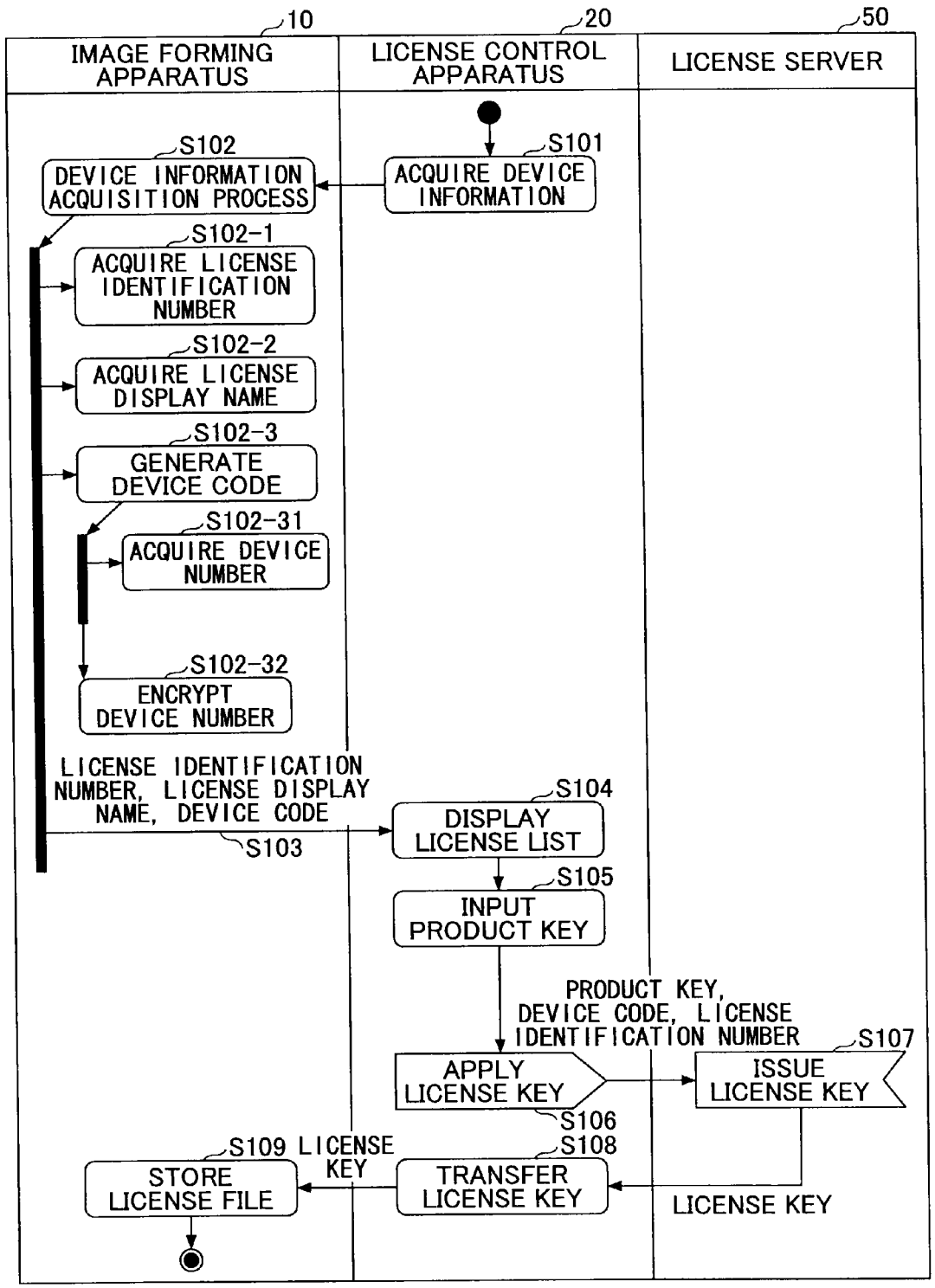
FIG. 10 is a diagram for explaining process steps of an issuance process of a license key and an introduction process of the license key to the image forming apparatus according to the embodiment of the present invention.

Hereinafter, process steps of the license management system 100 will be described. FIG. 10 is a diagram for explaining the process steps for an issuance process and an introduction process of the license key to the image forming apparatus 10. In FIG. 10, it is assumed that at least one SDK application 140 is purchased and installed into the image forming apparatus 10, and that an operator (an administrator or the like) operates from the license control apparatus 20.

When the image forming apparatus 10 is selected by the operator at the license control apparatus 20 to install the license key, the license acquisition part 22 of the license control apparatus 20 sends an acquisition request of device information with respect to the selected image forming apparatus 20 (step S101). For example, the image forming apparatus 10 to install the license key is selected by operating at a display screen of list information of a plurality of the image forming apparatuses 10, which is displayed by the license control apparatus 20 automatically searching for the image forming apparatuses 10 being connected to the network 30. Alternatively, an IP address of the image forming apparatus 10 to install the license key may be input directly.

When the image forming apparatus 10 receives the acquisition request of the device information, the license introduction part 151 of the image forming apparatus 10 executes the following steps as the acquisition process of the device information (step S102). First, by referring to each of the license information files 1402 included in the respective SDK applications 140 being installed in the image forming apparatus 10, the license introduction part 151 acquires the license identification number and the license display name corresponding to the license identification number (step S102-1 and step S102-2). Subsequently, the license introduction part 151 executes a generation process to generate a device code of the image forming apparatus 10 (step S102-3). First, for example, a device number of the image forming apparatus 10 is acquired from the ROM 113 (step S102-31). Subsequently, the license introduction part 151 generates the device code by encrypting the acquired device number (step S102-32). That is, the device code is a code sequence in which the device number is encrypted.

Subsequently, the license introduction part 151 returns each of the license identification numbers, each of the license display names, and the device number as the device information to the license control apparatus 20 (step S103). The license identification numbers and the license display names, which are acquired from the plurality of the license information files 1402 for one SDK application 140, may be duplicated. For example, referring to FIG. 5, the license identification number "123456789-01" and the license display name "AAA_basic" are acquired from three sets of the license information. Accordingly, the license introduction part 151 excludes duplications and returns the device information in which the duplications are excluded, to the license control apparatus 20.

Subsequently, the license acquisition part 22 of the license control apparatus 20 displays a list of the license display names included in the received device information at a display unit, and has the operator select the subject license (license identification number) to acquire the license key from the list (step S104). Subsequently, the license acquisition part 22 receives an input of the product key with respect to the SDK application 140 according to the selected license (step S105). It is assumed that the operator has already acquired the product key. For example, in a case of distributing the SDK application 140 by a recording medium, the product key is attached to the recording medium. Also, in a case of distributing the SDK application 140 through the network 30, the product key is recorded within a file distributed with the SDK application 140.

Subsequently, the license acquisition part 22 sends an issuance request of the license key with the product key being input, the received device code, and the selected license identification number, to the license server 50 (step S106).

In response to the issuance request, the license issuance part 51 of the license server 50 determines whether or not the number of the issued licenses of the product key included in the issuance request reaches the number of the licenses, by referring to the license issuance information management table 53 corresponding to the application ID included in the license identification number. When the number of the issued licenses does not reach the number of the licenses, the license issuance part 51 generates the license key based on the received device code and product key, and the license issuance information management table 53 (step S107).

FIG. 11 is a diagram illustrating a configuration example of the license key. In FIG. 11, one license key is formed as data including the license identification number and the device code. The license key permits the function modules 1401 of the SDK application 140 corresponding to the "license identification number" to be used at the image forming apparatus 10 identified by the "device code (device number)". The license identification number and the device code are included in the received issuance request of the license. The license key may not be a simple letter string of the license identification number and the device code, but may be a letter string in which the license identification number and the device code are encoded and further encrypted.

When the license key is issued, the license issuance information update part 52 updates the number of the issued licenses in the license issuance information management table 53.

FIG. 12 is a diagram illustrating a configuration example of the license issuance information management table 53 updated by issuing the license key, according to the embodiment of the present invention. In FIG. 12, a case of issuing the license key with respect to the product key "AAA" is given as an example. By issuing the license key, the number of issued licenses is updated to "1" for the product key "AAA". Also, an issued license key "BJP138-BUQ" is registered. "BJP138-BUQ" depicts the license key being encoded and encrypted.

Subsequently, the license issuance part 51 sends the generated license key to the license control apparatus 20 (step S108). In step S107, when the number of the issued licenses reaches the number of the licenses, the license issuance part 51 denies generating the license key. Accordingly, in this case, the license issuance part 51 sends information indicating that the license key is not issued, to the license control apparatus 20 in step S108.

When the license acquisition part 22 of the license control apparatus 20 receives the license key, the license distribution part 23 transfers the license key to the image forming apparatus 10 (step S108). When the license introduction part 151 of the image forming apparatus 10 receives the license key, the license introduction part 151 stores the license key in the license file 170 (step S109). The license file 170 is associated with the SDK application 140 by a file name of the license file 170, a name of a storage location (a folder), and the like. Any one of other methods can be used for this association between the license file 170 and the SDK application 140.

Figure 13:
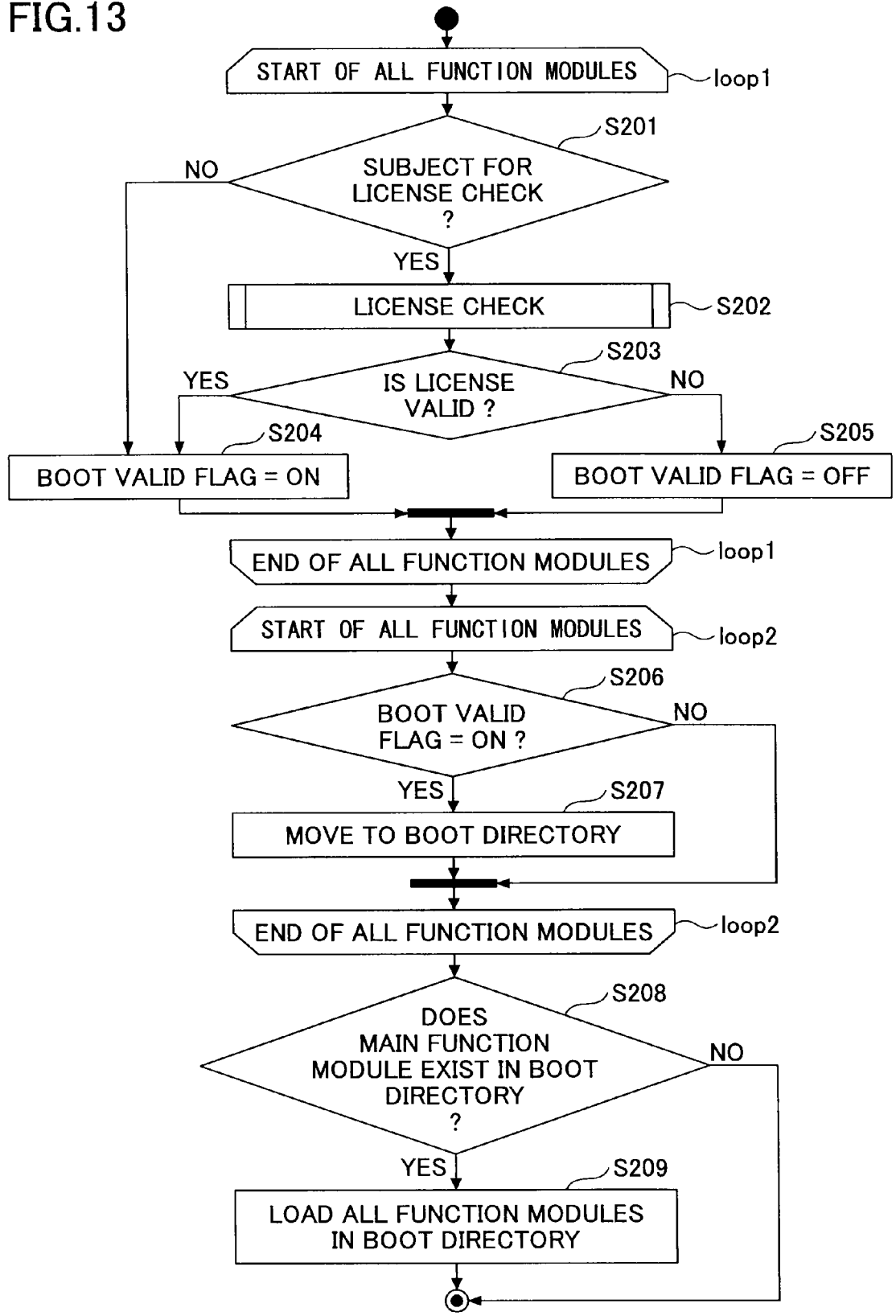
FIG. 13 is a diagram for explaining process steps of a process for activating the SDK application in the image forming apparatus, according to the embodiment of the present invention.

By introducing the license key, the SDK application 140 according to the license key can be activated (used). Subsequently, a process for activating the SDK application 140 will be described. FIG. 13 is a diagram for explaining process steps of the process for activating the SDK application 140 in the image forming apparatus 10, according to the embodiment of the present invention.

For example, a list of the SDK applications 140 installed into the image forming apparatus 10 to be operated is displayed at the operation panel 16. The operator of the image forming apparatus 10 selects a desired SDK application 140 from the list, and inputs an indication of activating the desired SDK application 140. In response to the indication, the boot control part 154 indicates the desired SDK application 140 as a subject to be activated, and requests the determination part 153 to check a presence or absence of the license of the desired SDK application 140 (hereinafter, simply called "license check"). The determination part 153 starts a process illustrated in FIG. 13.

The determination part 153 executes a loop process concerning a loop 1 for each of the function modules 1401 included in the SDK application 140, which is specified by the application ID indicated by the boot control part 154. That is, the determination part 153 determines whether or not each of the function modules 1401 is a subject of the license check (step S201). This determination is conducted based on whether or not the function modules 1401 are associated with the respective license information files 1402 (whether or not the license information file 1402 accompanying each of the function modules 1401 exists). For example, for each of the function modules 1401 such as the function modules 1401a, 1401c, and 1401d accompanying the license information files 1402a, 1402c, and 1402d in FIG. 4 (YES in step S201), the determination part 153 executes the license check (step S202).

In detail, based on the license information files 1402 accompanying the function modules 1401, the determination part 153 determines the license identification corresponding to each of the function modules 1401. Subsequently, the determination part 153 determines whether or not the license key including the license identification information is stored in one or more license files 170 corresponding to the SDK application 140 subject to be activated. Subsequently, the determination part 153 determines whether or not a value (device number) decrypted from the device code included in the license key matches the device number of the image forming apparatus 10 subject to be operated. When all determination results are positive, the determination part 153 determines that the license exists (is valid) for all function modules 1401. If at least one negative determination result exists, the determination part 153 determines that the license does not exist (is invalid) for a respective function module 1401.

For the function modules 1401 in which the licenses are valid (YES in step S203), the determination part 153 sets "ON" to a boot valid flag (step S204). Also, for the respective function module 1401 in which the license is invalid (NO in step S203), the determination part 153 sets "OFF" to the boot valid flag (step S205). The boot valid flag is a flag variable which is generated in the RAM 112 for each of the function modules 1401 to record the valid or invalid license.

On the other hand, for the function module 1401 such as the function module 1401b in FIG. 4 in which there is no accompanying the license information file 1402 (NO in step S201), the determination part 153 sets "ON" to the boot valid flag without conducting the license check (step S204).

When the loop 1 is completed, the determination part 153 conducts a loop process concerning a loop 2 for all function modules 1401 included in the SDK application 140 subject to activation. That is, the determination part 153 checks a value of the boot valid flag corresponding to each of the function modules 1401 (step S206). For the function module 1401 in which the value of the boot valid flag is "ON", the determination part 153 moves or copies an entity of the function module 1401 to a boot directory (step S207). That is, the boot directory is a predetermined directory (folder) on a file system.

When the process of the loop 2 is completed, the boot control part 154 determines a presence or absence of the main function module 1401 (such as the function module 1401a given as an example in FIG. 4) (step S208). That is, a presence or absence of the function module 1401 which is positioned at a highest level in the dependency relation in all function modules 1401 is determined. The presence or absence of the main function module 1401 may be determined based on the license information file 1402 accompanying each of the function modules 1401 in the boot directory. That is, if there is the license information file 1402 in which "00" is included in the license identification sub-number, the function module 1401 associated with the license information file 1402 is the main function module 1401.

When the main function module 1401 exists in the boot directory, the boot control part 154 loads the function module 1401 in the boot directory and executes the SDK application 140 (step S209). On the other hand, when the main function module 1401 does not exist in the boot directory, the boot control part 154 terminates this process without loading any one of the function modules 1401. In this case, the SDK application 140 is not activated.

As described above, in the image forming apparatus 10 according to the embodiment, the license management can be conducted by a unit of the function module 1401 (that is, by a function unit) forming the SDK application 140. Therefore, it is possible to significantly improve flexibility of the license management of the program, compared to a case of conducting the license management for each application.

Moreover, with respect to the SDK application 140 having the same configuration, it is possible to make various license configurations based on the definitions of the license information files 1402. From this viewpoint, it is possible to improve the flexibility of the license management.

For the SDK application 140 having the configuration in FIG. 4, other definition examples and other license configuration examples depending on the other definition examples of the license information file 1402 will be described as follows.

Figure 14:
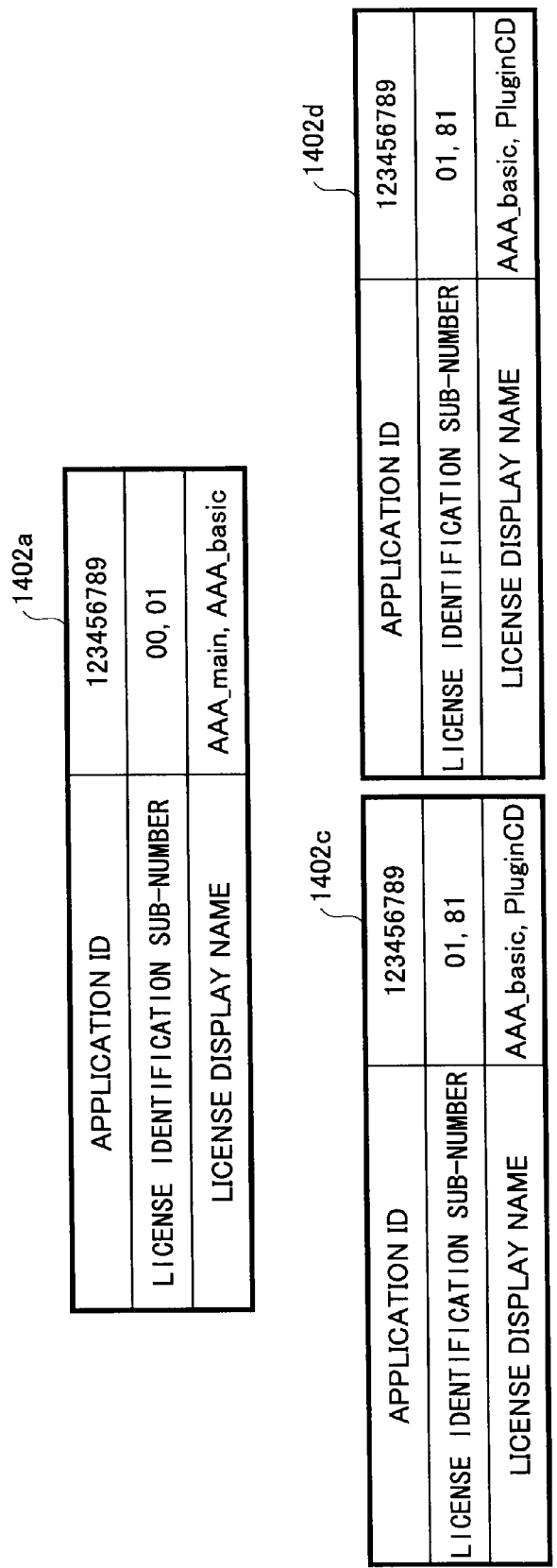
FIG. 14 is a diagram illustrating a second definition example of the license information file of each of the function modules according to the embodiment of the present invention.

FIG. 14 is a diagram illustrating a second definition example of the license information file 1402 of each of the function modules 1401 according to the embodiment of the present invention.

As given as example in FIG. 14, the license identification sub-numbers of the license information file 1402a are "00" and "01". In each of the license information files 1402c and 1402d, the license identification sub-numbers are "01" and "81". The license display name "PluginCD" corresponds to the license identification number "123456789-81".

FIG. 15 is a diagram illustrating a configuration of the licenses which become valid based on the second definition example of the license information file 1402 in FIG. 14. In FIG. 15, the function modules A, C, and D correspond to the function modules 1401a, 1401c, and 1401d, respectively.

As illustrated in FIG. 15, by the license key concerning the license identification number "123456789-00" (AAA_main), the right to use is given for the function module 1401a alone. By the license key concerning the license identification number "123456789-01" (AAA_basic), the right to use is given for the function modules 1401*a*, 1401*c*, and 1401*d*. By the license key concerning the license identification number "123456789-81" (PluginCD), the right to use is given for the function modules 1401*c* and 1401*d*. In the embodiment, in order to activate the plug-in function modules 1401 (the function modules 1401*c* and 1401*d* in FIG. 4), it is required to activate the main function module 1401 (the function module 1401*a* in FIG. 4) positioned at the highest level in the dependency relation. To use all function modules 1401, one license key concerning the license identification number "123456789-01" may be acquired, or one license key concerning "123456789-00" and another license key concerning "123456789-81" may be acquired.

Figure 16:
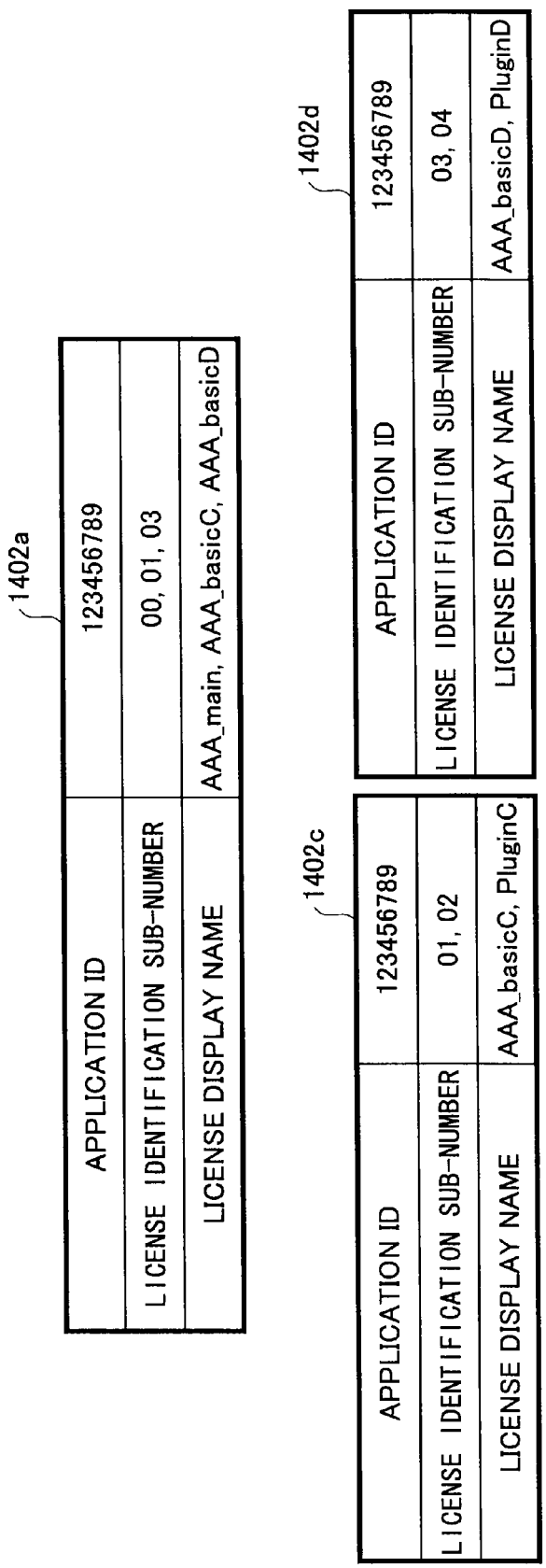
FIG. 16 is a diagram illustrating a third definition example of the license information file of each of the function modules according to the embodiment of the present invention.

FIG. 16 is a diagram illustrating a third definition example of the license information file 1402 of each of the function modules 1401 according to the embodiment of the present invention.

In the third definition example illustrated in FIG. 16, the license identification sub-numbers of the license information file 1402*a* are "00", "01", and "03". The license identification numbers of the license information file 1402*c* are "01" and "02". Also, license identification numbers of the license information file 1402*d* are "03" and "04".

FIG. 17 is a diagram illustrating a configuration example of the licenses which become valid based on the third definition example of the license information file 1402 in FIG. 16. In FIG. 16, the function modules A, C, and D correspond to the function modules 1401*a*, 1401*c*, and 1401*d*, respectively.

As illustrated in FIG. 17, by the license key concerning the license identification number "123456789-00" (AAA_main), the right to use is given for the function module 1401*a* alone. Moreover, by the license key concerning the license identification number "123456789-01" (AAA_basicC), the right to use is given for the function modules 1401*a* and 1401*c*. By the license key concerning the license identification number "123456789-02" (PluginC), the right to use is given for the function module 1401*c* alone. By the license key concerning the license identification number "123456789-03" (AAA_basicD), the right to use is given for the function modules 1401*a* and 1401*d*. By the license key concerning the license identification number "123456789-04" (PluginD), the right to use is given for the function module 1401*d* alone. Accordingly, to use all function modules 1401, three license keys concerning "123456789-01", "123456789-02", and "123456789-03" are acquired.

It should be noted that regards the configuration of the SDK application 140, various configurations other than that in FIG. 4 can be applied. Based on the applied configuration, various license configurations can be formed.

According to the present invention, a license of an application can be managed in response to a usage pattern of a user. Therefore, not only it is convenient for a user but also a business opportunity can be extended to a distributor of the application.

The present invention is not limited to the specifically disclosed embodiments, and variations and modifications may be made without departing from the scope of the invention.

The present application is based on the Japanese Priority Patent Application No. 2008-235679 filed Sep. 12, 2008, the entire contents of which are hereby incorporated by reference.

What is claimed is:

1. An apparatus including a plurality of program modules for realizing an image process by an application that is added to the apparatus, said apparatus comprising:
a correspondence information memory configured to store correspondence information associating the plurality of program modules with a plurality of sets of license data for the application, the plurality of program modules having a dependency relationship and a program module of the plurality of program modules positioned at a highest level in the dependency relationship being essential to use the application with the apparatus; and
circuitry configured to:
send an identifier of license data with an identifier of the apparatus;
receive the license data through a network, the license data issued based on the identifier of the license data and the identifier of the apparatus;
store the license data into the correspondence information by associating the license data with the plurality of program modules forming the application;
determine whether to permit or deny activation based on the license data for each of the plurality of program modules included in the application including permitting or denying activation of at least one program module based upon whether the at least one program module includes the program module positioned at the highest level in the dependency relationship; and
activate the at least one program module which is permitted to be activated, wherein
the circuitry is configured to validate the license data for each program module of the plurality of program modules having the dependency relationship regardless of whether license data of any other of the plurality of program modules having the dependency relationship validates unsuccessfully before the circuitry determines whether to permit or deny activation based on the license data for any of the plurality of program modules having the dependency relationship, and
when dependency relationship information indicates that a program module is dependent upon another program module of the plurality of program modules, the circuitry validates the program module that is dependent upon the other program module based upon license identification information of the other program module to realize the image process.

2. The apparatus as claimed in claim 1, wherein the circuitry is configured to deny activating a particular program module other than the program module positioned at the highest level in the dependency relation, when the activation of the program module positioned at the highest level is denied.

3. The apparatus as claimed in claim 1, wherein
the correspondence information is formed by files associated respectively with some of the program modules, and
each of the files stores an identification of the license data corresponding to a program module associated with one of the files.

4. The apparatus as claimed in claim 3, wherein the circuitry is configured to suppress a determination of whether to permit or deny the activation based on the license data for a program module with which a file is not respectively associated.

5. The apparatus as claimed in claim 1, wherein
the license data is further issued based upon an allowable issuance number associated with each of one or more licenses, and
the allowable issuance number is a number of times a particular one of the one or more licenses is permitted to be issued corresponding to a particular product key.

6. The apparatus as claimed in claim 5, wherein the license data is further issued based on a number of issued licenses associated with each of the one or more licenses.

7. The apparatus as claimed in claim 6, wherein the license data is not issued if the number of issued licenses is equal to the allowable issuance number.

8. The apparatus as claimed in claim 1, wherein the license data is further issued based on a number of issued licenses associated with each of the one or more licenses.

9. The apparatus as claimed in claim 8, wherein the license data is not issued if the number of issued licenses is equal to the allowable issuance number.

10. The apparatus as claimed in claim 1, wherein to validate the license data for each program module of the plurality of program modules having the dependency relationship, the circuitry is configured to determine whether or not the license data includes the identifier of the apparatus.

11. The apparatus as claimed in claim 1, wherein the circuitry is configured to:
send the identifier of the license data and the identifier of the apparatus to a license server through the network, and
receive the license data through the network from the license sever that issued the license data based on the identifier of the license data and the identifier of the apparatus.

12. The apparatus as claimed in claim 1, wherein the circuitry is configured to:
acquire the identifier of the license data for each of the plurality of program modules included in the application, and
exclude duplicative identifiers of the identifiers of the license data for each of the plurality of program modules included in the application.

13. A license determination method performed in an apparatus including a plurality of program modules for realizing an image process by an application that is added to the apparatus, said license determination method comprising:
storing correspondence information associating the plurality of program modules with a plurality of sets of license data for the application, the plurality of program modules having a dependency relationship and a program module of the plurality of program modules positioned at a highest level in the dependency relationship being essential to use the application with the apparatus;
sending an identifier of license data with an identifier of the apparatus;
receiving license data through a network, the license data issued based on the identifier of the license data and the identifier of the apparatus;
storing the license data into the correspondence information by associating the license data with the plurality of program modules forming the application;
determining whether to permit or deny activation based on the license data for each of the plurality of program modules included in the application by permitting or denying activation of at least one program module based upon whether the at least one program module includes the program module positioned at the highest level in the dependency relationship; and
activating the at least one program module which is permitted to be activated in the determination whether to permit or deny activation, wherein
license data is validated for each program module of the plurality of program modules having the dependency relationship regardless of whether license data of any other of the plurality of program modules having the dependency relationship validates unsuccessfully before the determining whether to permit or deny activation based on the license data for any of the plurality of program modules having the dependency relationship, and
when dependency relationship information indicates that a program module is dependent upon another program module of the plurality of program modules, the program module that is dependent upon the other program module is validated based upon license identification information of the other program module to realize the image process.

14. The license determination method as claimed in claim 13, wherein
the determination whether to permit or deny activation is configured to deny activating a particular program module other than the program module positioned at the highest level in the dependency relation, when the activation of the program module positioned at the highest level is denied.

15. The license determination method as claimed in claim 13, wherein
the correspondence information is formed by files associated respectively with some of the program modules, and
each of the files stores an identification of the license data corresponding to a program module associated with one of the files.

16. The license determination method as claimed in claim 15, wherein the determination whether to permit or deny activation is configured to suppress a determination whether to permit or deny activation based on the license data for a program module with which a file is not respectively associated.

17. A non-transitory computer-readable medium recorded with a computer program for causing an apparatus including a plurality of program modules for realizing an image process by an application that is added to the apparatus, said computer program comprising codes for:
storing correspondence information associating the plurality of program modules with a plurality of sets of license data for the application, the plurality of program modules having a dependency relationship and a program module of the plurality of program modules positioned at a highest level in the dependency relationship being essential to use the application with the apparatus;
sending an identifier of license data with an identifier of the apparatus;
receiving license data through a network, the license data issued based on the identifier of the license data and the identifier of the apparatus;
storing the license data into the correspondence information by associating the license data with the plurality of program modules forming the application;
determining whether to permit or deny activation based on the license data for each of the plurality of program modules included in the application by permitting or denying activation of at least one program module based upon whether the at least one program module includes the program module positioned at the highest level in the dependency relationship; and activating the at least one program module which is permitted to be activated in the determination whether to permit or deny activation, wherein license data is validated for each program module of the plurality of program modules having the dependency relationship regardless of whether license data of any other of the plurality of program modules having the dependency relationship validates unsuccessfully before the determining whether to permit or deny activation based on the license data for any of the plurality of program modules having the dependency relationship, and when dependency relationship information indicates that a program module is dependent upon another program module of the plurality of program modules, the program module that is dependent upon the other program module is validated based upon license identification information of the other program module to realize the image process.

18. The non-transitory computer-readable medium as claimed in claim 17, wherein the determination whether to permit or deny activation is configured to deny activating a particular program module other than the program module positioned at the highest level in the dependency relation, when the activation of the program module positioned at the highest level is denied.

19. The non-transitory computer-readable medium as claimed in claim 17, wherein the correspondence information is formed by files associated respectively with some of the program modules, and each of the files stores an identification of the license data corresponding to a program module associated with one of the files.

20. The non-transitory computer-readable medium as claimed in claim 19, wherein the determination whether to permit or deny activation is configured to suppress a determination of whether to permit or deny activation based on the license data for a program module with which a file is not respectively associated.

\* \* \* \* \*